United States Patent [19]

Fuersich et al.

[11] Patent Number: 5,461,458
[45] Date of Patent: Oct. 24, 1995

[54] METHOD OF AUTOMATICALLY CONTROLLING EXPOSURE WHEN MAKING PRINTS FROM FILM FROM PORTRAIT-PHOTOGRAPHY STUDIOS

[75] Inventors: Manfred Fuersich, Taufkirchen; Wolfgang Zahn, Munich, both of Germany

[73] Assignee: AGFA-Gevaert Aktiengesellschaft, Leverkusen, Germany

[21] Appl. No.: 363,980

[22] Filed: Dec. 23, 1994

Related U.S. Application Data

[63] Continuation of Ser. No. 107,485, Aug. 17, 1993, abandoned.

[30] Foreign Application Priority Data

Sep. 15, 1992 [DE] Germany .................. 42 30 843.7

[51] Int. Cl.$^6$ .................................................. G03B 27/80
[52] U.S. Cl. .................................................. 355/77; 355/40
[58] Field of Search .................. 355/35, 38, 40, 355/77

[56] References Cited

U.S. PATENT DOCUMENTS

| | | | |
|---|---|---|---|
| 3,735,350 | 5/1973 | Lemelson | 340/146.35 X |
| 4,274,732 | 6/1981 | Thurm et al. | 355/38 |
| 4,279,502 | 7/1981 | Thurm et al. | 355/38 |
| 4,492,474 | 1/1985 | Miller | 355/77 X |
| 4,529,301 | 7/1985 | Rountree | 355/77 |
| 5,159,385 | 10/1992 | Imamura | 355/28 |

OTHER PUBLICATIONS

Dictionary of Photographic Technologies, D. A. Spencer 1973, p. 273.

Primary Examiner—Michael L. Gellner
Assistant Examiner—D. P. Malley
Attorney, Agent, or Firm—Karl F. Milde, Jr.

[57] ABSTRACT

A method of automatically controlling exposure when printing from film which is exposed under controlled lighting conditions. The prevailing lighting conditions are determined by photographing a standard subject in the form of a gray-scale board with at least one field of gray and illuminated by the studio lighting. The gray scale is recognized as a standard subject during region-by-region analysis of the film's frames and the results obtained from the gray scale are employed as a film-specific standard in computing the levels of light to use for printing.

8 Claims, 3 Drawing Sheets

METHOD OF AUTOMATICALLY CONTROLLING EXPOSURE WHEN MAKING PRINTS FROM FILM FROM PORTRAIT-PHOTOGRAPHY STUDIOS

This application is a continuation of application Ser. No. 107,485, filed Aug. 17, 1993, now abandoned.

BACKGROUND OF THE INVENTION

The present invention concerns a method of automatically controlling exposure when printing from film which is exposed under controlled lighting conditions, such as at a portrait studio. The prevailing lighting conditions are determined by photographing a standard subject, in the form of a gray-scale board with at least one field of gray, that is illuminated by the studio lighting.

The German Patent No. 2,840,287 and its corresponding U.S. Pat. No. 4,279,502 disclose a method of determining the levels of the three primary colors of light involved in printing color photographs, whereby the individual frames of a whole strip of film are scanned for each color region by region and differences between the results are established and assigned to the mean density of each point. The functional relationship between the color-density differences and the mean density is then plotted in the form of a curve called the curve of color-density difference. The curve makes it possible to control the colors in the print in terms of the mean density of the original film and leads to very satisfactory results even in the event of color casts. It is of course difficult to determine what points to plot the curve from because points with color dominance or lighting-dictated casts must not be included. The German Patent No. 2,803,381 and its corresponding U.S. Pat. No. 4,274,732 disclose eliminating these drawbacks by exposing an unexposed area of the strip of undeveloped film to a gray-scale image to serve as a color standard once the film has been developed. The gray scale acts as a density-difference curve for the regions without color.

There are, however, several drawbacks to this approach. First, it requires extra exposure. There is very little area left over for the gray scale on ordinary strips of film. Further, the gray scale can be washed out by highly exposed frames. The exposed film may be left in the heat before the gray scale is added. Finally, overall casts can also lead to discoloration. These problems must particularly be avoided in films deriving from portrait studios, where the lighting conditions are precisely known and where the prints must be especially high in quality.

SUMMARY OF THE INVENTION

The principal object of the present invention is accordingly to provide an improvement in the aforesaid method whereby color-correct prints can be produced in spite of the misfortunes of the exposed film or of discoloration of the subject due to casts.

This object, as well as other objects which will become apparent from the discussion that follows, are achieved, in accordance with the present invention, by using the gray scale as a standard subject during region-by-region analysis of the film's frames and employing the results obtained from the gray scale as a film-specific standard in computing the levels of light to use for printing.

Lighting the gray field with the same light employed in the studio to light the subject records any lighting-dictated cast due to interception of the gray-scale boards exposed to the same light and allows the cast to be instrumentationally compensated. The identifying strip on the gray-scale board, that can be recognized by the printer, makes it possible to analyze the board automatically and to correct the printer accordingly.

For a full understanding of the present invention, reference should now be made to the following detailed description of the preferred embodiment of the invention as illustrated in the accompanying drawings.

DESCRIPTION OF THE PREFERRED EMBODIMENT

Figure 1:
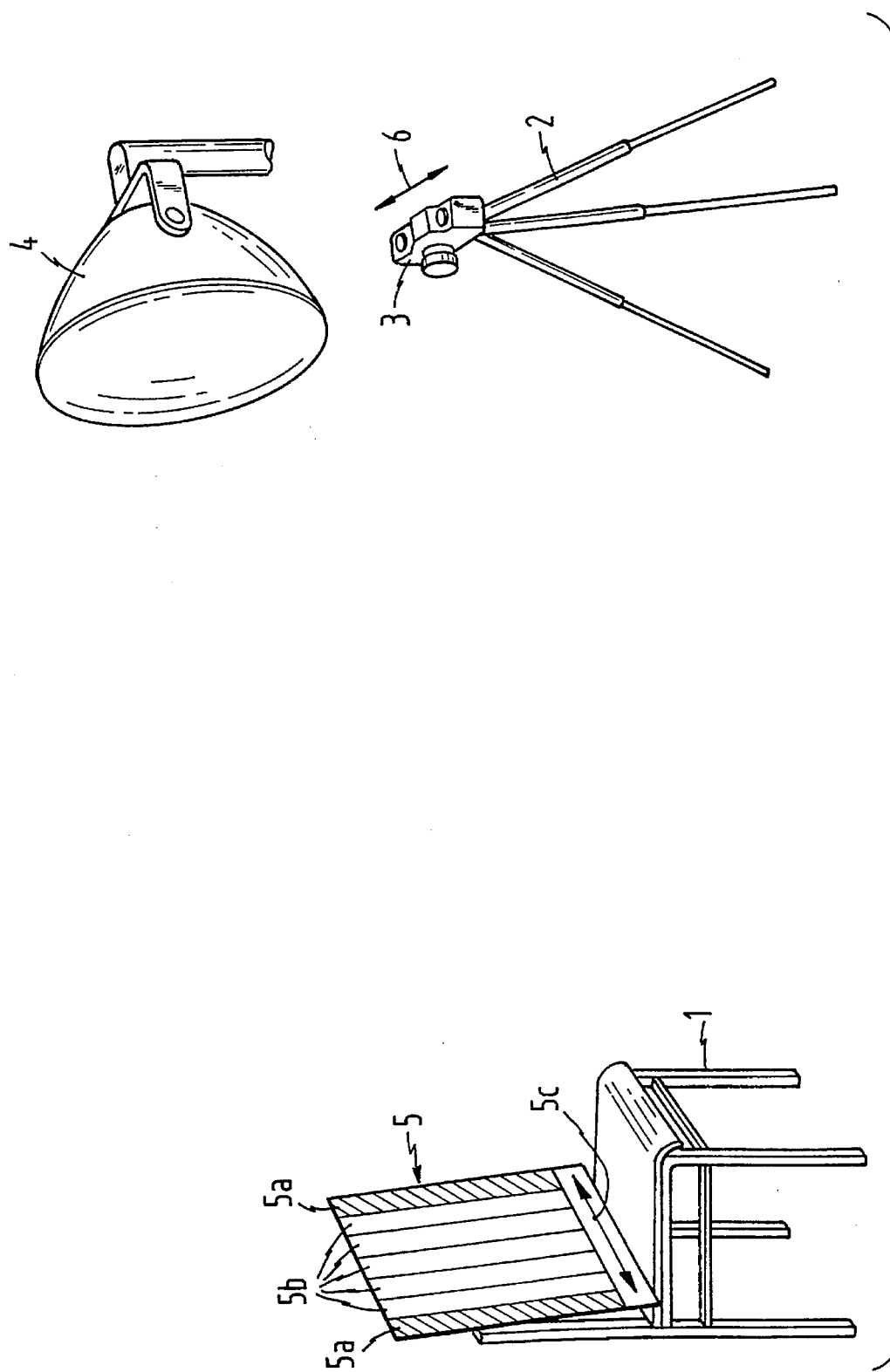
FIG. 1 is a schematic representation of a portrait studio while a photograph is being taken of a gray-scale board.

As shown in the figure, the subject will be sitting on a chair 1 or other support. A conventional camera 3 is focused on the chair 1. Also aimed at the chair is a lighting device 4, a floodlight with a xenon flash bulb. The bulb's color temperature closely matches that of daylight. A wide reflector extensively washes any shadows out of the subject's face.

In order to obtain documentation of the spectral relationships prevailing during the session, for subsequent print making, the photographer employs a special gray-scale board 5. The photographer photographs this board at the beginning or end of every series of exposures using exactly the same lighting he uses to photograph the subject. The gray-scale board 5 has an identifying strip 5a at least at each upright edge. The identifying strip 5a can be a wide margin of a color that will be easy for an automatic identification system to recognize and is accordingly fairly uncommon, pink for example. The identifying strip 5a could alternatively be a series of parallel vertical black lines which form a bar code. Between the parallel identifying strips 5a are fields 5b in the form of strips of gray. The first field 5b on the left for example is very light and will be represented in the film negative as 10% below saturation when conventionally illuminated. The middle field will produce a medium gray in the photograph. The darkest field, the farthest to the right for example, will result in the photograph to 10% above the background fog. At the bottom of the board is a blank space accommodating an arrow 5c paralleling the direction traveled by the film (indicated by arrow 6) in camera 3. The arrow will be unnecessary if the controls are sophisticated enough, in which case the identifying strip can be provided at all four edges or left out completely. Its position in the first or last frame of the film will then be exploited for identification.

To initiate a session the photographer turns on the lighting device 4, places the gray-scale board 5 on the chair 1 that the subject will sit in, and photographs the board with the same lighting that will be employed to photograph the subject.

Figure 2A:
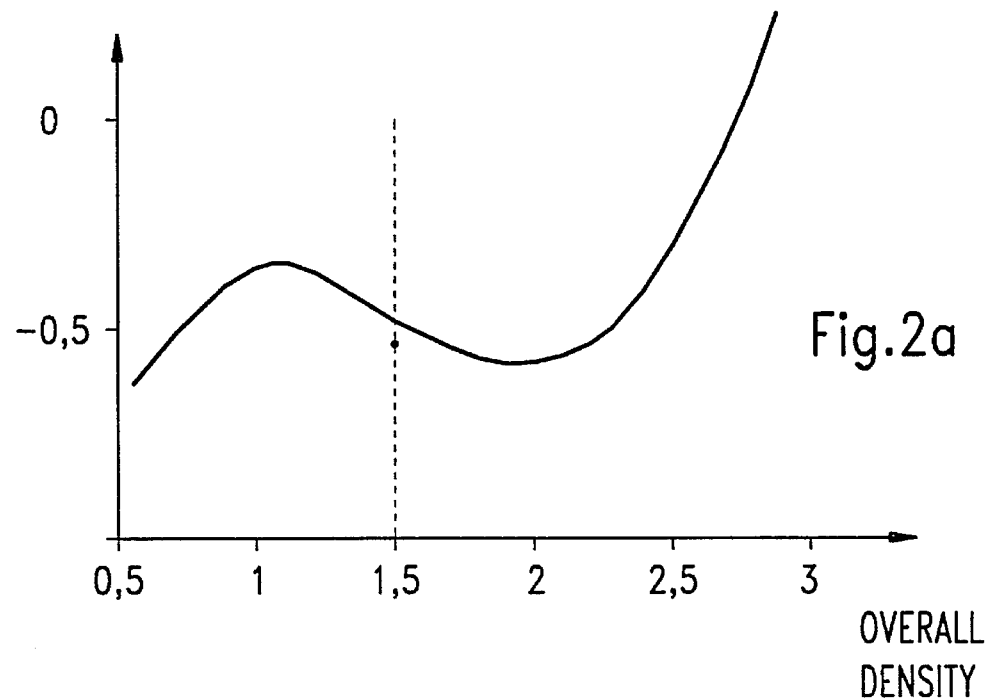
FIGS. 2a and 2b are graphic representations of color density differences in curves indicative of density differences between red and green and blue and green, respectively.
Figure 2B:
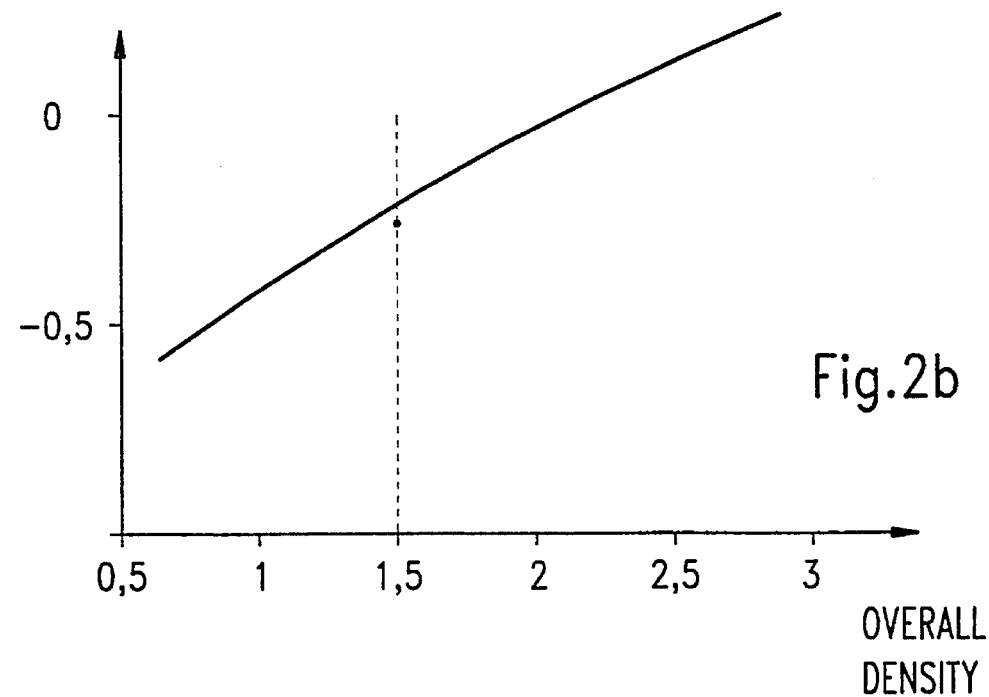
Figure 3:
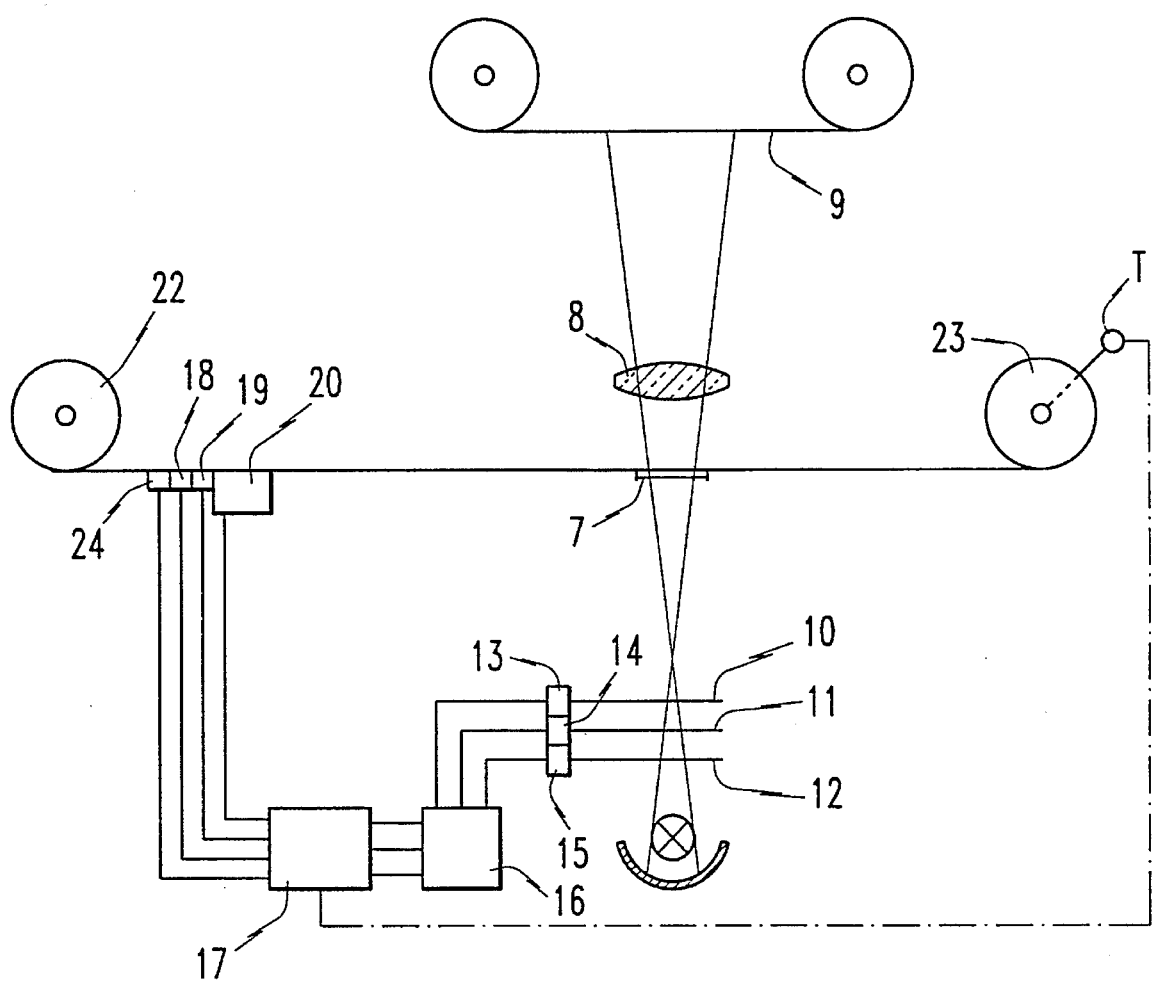
FIG. 3 is a diagrammatic view of a color copying machine employing light-determining apparatus and a device for automatically recognizing a photographic image of a gray scale board according to the invention.

Once the film has been developed, it travels through the scanning section of a printer that accommodates exposure controls of the type disclosed in the U.S. Pat. No. 4,279,502, which disclosure is incorporated herein by reference. Referring to FIG. 3, which is a reproduction of FIG. 1 of this patent, it may be seen that the scanner scans and stores results for each primary color in every region of every frame along with its position in a memory. The exposure controls initially search for data representing the frames at the beginning and end of the film. If several films have been cemented (spliced) together, the ends will be appropriately marked and detected by the device 18. If the scanner device 20 connected to a properly programmed computer 17, or a separate detector 24 connected to this same computer, identifying strips 5a with fields 5b of gray between them in either frame, it will be aware that the film derives from a portrait studio and must be specially printed. In this event, the three color densities of fields 5b are measured, the difference values plotted over the mean values for each color, and a particular functional relationship between color and density for the specific film plotted in the form of a density-difference curve (FIGS. 2a and 2b) by interpolation. The results can be directly exploited as film-specific in the method disclosed in the U.S. Pat. No. 4,279,502. The film-specific data include the spectral peculiarity of the film, any lighting-dictated casts, and certain spectral irregularities in the camera's imaging system. All of these problems can be compensated for by using the curves plotted from the fields 5b of gray.

It is also desirable to ensure high-quality prints when customers re-order and the film strip has already been cut up into separate negatives. This can be attained by storing the aforesaid data for each strip so that they will be available without having to use the gray-scale board.

There has thus been shown and described a novel method of automatically controlling exposure when printing from film which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention, which is to be limited only by the claims which follow.

What is claimed is:

1. A method of automatically controlling exposure when printing film is exposed under controlled lighting conditions, whereby the prevailing lighting conditions are determined by photographing a standard subject, in the form of a gray-scale board with at least one field of gray, that is illuminated by the studio lighting, said method comprising the steps of:

automatically recognizing a photographic image of the gray-scale board as a standard subject during region-by-region analysis of the film's frames, and employing the results obtained from an analysis of the gray scale image as a film-specific standard in computing the levels of light to use for printing.

2. The method as defined in claim 1, wherein the gray-scale board has at least three gray-scale values, the results from which are interpolated and employed in a density-difference curve.

3. The method as defined in claim 1, wherein said gray-scale board further comprises an identifying strip at the edges of said board that are upstream and downstream in the direction the film travels through the camera.

4. The method defined in claim 3, wherein said identifying strip is a color which is not included in normal photographic portraits.

5. The method defined in claim 3, wherein said identifying strip is a bar code.

6. The method as defined in claim 3, wherein said automatic recognizing step includes the step of recognizing the image of the identifying strip of the gray-scale board.

7. A gray-scale board for carrying out the method defined in claim 1, said board having fields of at least three shades of gray that cover the density range of skin tones.

8. The gray-scale board as defined in claim 7, further comprising:

(1) identifying strips at the edges of said board at least paralleling the boundaries between the fields of gray; and (2) an arrow that indicates the direction that the film travels through the camera.

* * * * *